(12) United States Patent
Soylu

(10) Patent No.: US 10,738,863 B2
(45) Date of Patent: Aug. 11, 2020

(54) MECHANICAL FORCE GENERATOR AND RELATED KINEMATIC CHAINS

(71) Applicant: Resit Soylu, Ankara (TR)

(72) Inventor: Resit Soylu, Ankara (TR)

( * ) Notice: Subject to any disclaimer, the term of this patent is extended or adjusted under 35 U.S.C. 154(b) by 312 days.

(21) Appl. No.: 15/036,060

(22) PCT Filed: Nov. 6, 2014

(86) PCT No.: PCT/TR2014/000413
§ 371 (c)(1),
(2) Date: May 11, 2016

(87) PCT Pub. No.: WO2015/069207
PCT Pub. Date: May 14, 2015

(65) Prior Publication Data
US 2016/0290454 A1    Oct. 6, 2016

(30) Foreign Application Priority Data
Nov. 11, 2013 (TR) ................... 2013/13064

(51) Int. Cl.
*F16H 21/44* (2006.01)
*F16H 21/54* (2006.01)
*F16H 25/18* (2006.01)

(52) U.S. Cl.
CPC .................. *F16H 25/183* (2013.01)

(58) Field of Classification Search
CPC .................................................. F16H 25/183
See application file for complete search history.

(56) References Cited

U.S. PATENT DOCUMENTS

2006/0196296 A1* 9/2006 Don ................ B30B 1/10
74/469

FOREIGN PATENT DOCUMENTS

| SU | 715866 A1 | 2/1980 |
| SU | 1263946 A1 | 10/1986 |
| WO | 2013/102343 A1 | 7/2013 |

OTHER PUBLICATIONS

Artibolevskiy, I.I.; Mechanizny v sovremennoy tekhnike, 2-e izdanie, pererabotannoe, tom 1, Moska "Nauka" 1979, p. 21, fig. 1, p. 31, fig. 26.

(Continued)

*Primary Examiner* — Jake Cook
(74) *Attorney, Agent, or Firm* — Venjuris PC

(57) ABSTRACT

This invention is related to a mechanical force generator (MFG) (11), the cost, the maintenance costs and the energy consumption of which have been minimized, as much as possible, since the reaction forces, the reaction moments and the frictional forces at the joints that connect the mechanism to the ground have been minimized as much as possible; which does not possess any actuators; and which can generate any desired force variation. MFG (11) may be obtained by using 3 novel kinematic chains. By using these kinematic chains, it is also possible to obtain general purpose mechanisms, which have advantages similar to the MFG (11); which may include an actuator; which may generate relative translational motion at a joint as any desired function of relative translational motion at another joint; which may be used in many different fields such as hydraulic and pneumatic machines, internal combustion engines and compressors.

8 Claims, 7 Drawing Sheets

(56) References Cited

OTHER PUBLICATIONS

Artibolevskiy, I.I.; Mechanizny v sovremennoy tekhnike, tom 4, Moska "Nauka" 1975, p. 40, figs. 731, 732, p. 81, fig. 806.
Supp. International Search Report for PCT/TR2014/000413 and references cited therein.

* cited by examiner

| LINK NUMBER | 1 | 2 | 3 | 4 | 5 | 6 | 7 | 8 | 9 |
|---|---|---|---|---|---|---|---|---|---|
| 1 |  | P | P | P | P |  |  |  |  |
| 2 | P |  |  |  |  | R |  |  | R |
| 3 | P |  |  |  |  | $C_s$ | $C_s$ |  |  |
| 4 | P |  |  |  |  |  | R | R |  |
| 5 | P |  |  |  |  |  |  | $C_s$ | $C_s$ |
| 6 |  | R | $C_s$ |  |  |  |  |  |  |
| 7 |  |  | $C_s$ | R |  |  |  |  |  |
| 8 |  |  |  | R | $C_s$ |  |  |  |  |
| 9 |  | R |  |  | $C_s$ |  |  |  |  |

Figure 3

|  | EQUATIONS THAT THE KINEMATIC DIMENSIONS MUST SATISFY | EQUATIONS THAT THE INERTIAL PARAMETERS MUST SATISFY | EQUATIONS THAT THE LOADING CONDITIONS MUST SATISFY |
|---|---|---|---|
| MFG | (E10) – (E25) | (E29) – (E44) | (E45) – (E50) |
| MinFaS-TaT | (E10) – (E25) | (E29) – (E44) | (E48) – (E50) & (E59) – (E61) |

Figure 7

MECHANICAL FORCE GENERATOR AND RELATED KINEMATIC CHAINS

TECHNICAL FIELD

This invention is related to a mechanical force generator (MFG), the cost, the maintenance cost and the energy consumption of which has been reduced as much as possible; which doesn't include any actuators; which can generate any desirable force variation; and this invention is also related to general purpose mechanisms, which can be obtained from the 3 novel kinematic chains that the MFG has been derived from; which can be used in many different applications, such as hydraulically and pneumatically actuated machines, internal combustion engines and compressors; which possess advantages similar to the MFG; and which may include actuators.

BACKGROUND ART

In the literature, there are many 1 degree of freedom planar mechanisms, the input and output links of which are translating. For example, in FIG. 1, the double slider mechanism, which is a one degree of freedom, planar mechanism, is shown with the input and output parameters being denoted by $s_i$ and $s_o$. In this mechanism, it is possible to generate, approximately, any desired force $F(s_o)$; and any input-output relation, given by equation (E1), by properly designing the kinematic dimensions, the free length of the spring used, and the spring constant k. Although the input-output relation given by equation (E1) and the desired force, $F(s_o)$, can be produced only approximately in the double slider mechanism; it is possible to generate, as much as the physical constraints allow, any desired input-output relation and any desired force without making any approximations i.e., exactly in the desired manner, by using mechanisms that include a cam pair and/or a cylinder in slot joint.

Figure 1:
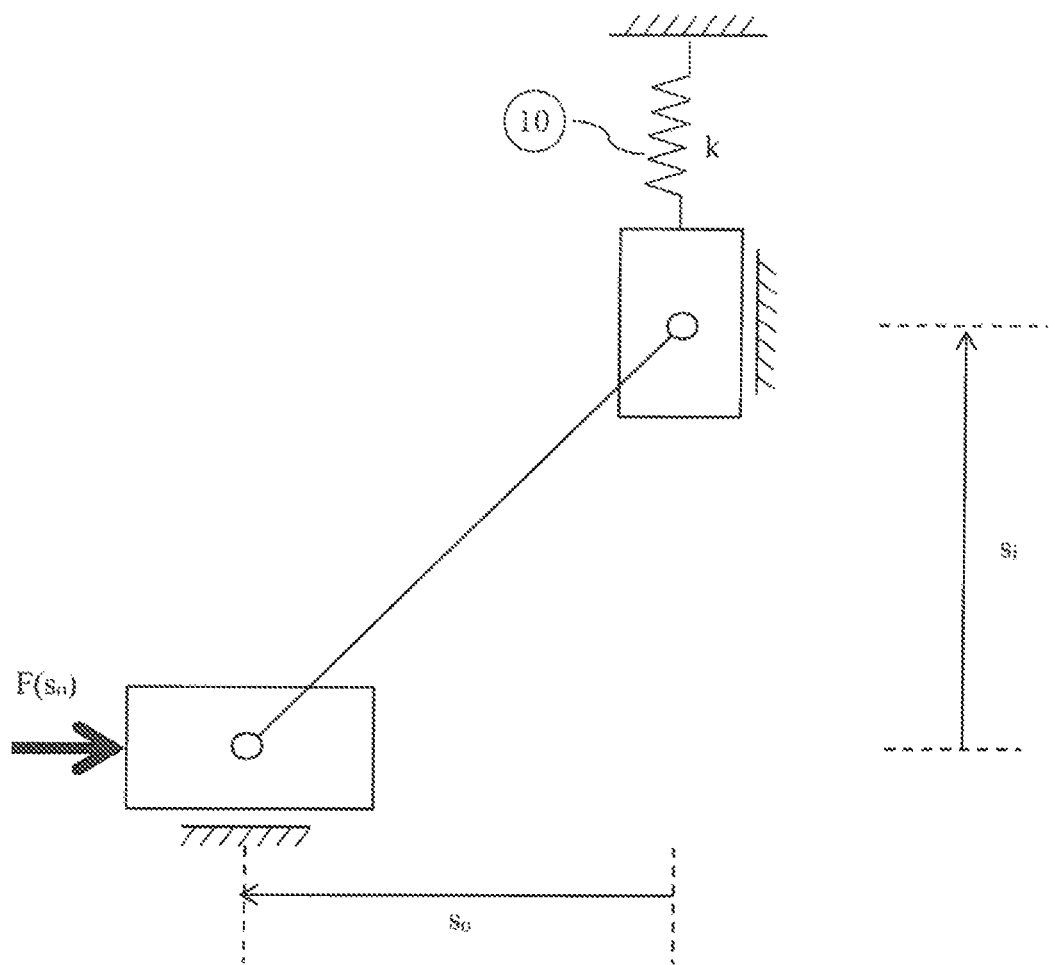

The double slider mechanism shown in FIG. 1 is connected to the ground by 2 prismatic joints. The reaction forces, reaction moments and frictional forces that occur at these 2 joints constitute the shaking forces and moments exerted on the ground. The aforementioned shaking forces and moments will depend upon the $F(s_o)$ force that is generated, the inertia forces and moments, due to D'Alembert's principle, that act on the moving links; and the weights of the links. In general, in this type of an application, the shaking forces and moments will, to a large extent, be due to the $F(s_o)$ force and the inertia forces and moments; and the contribution of the weights of the links to the shaking forces and moments will be relatively smaller.

As is well known, the shaking forces and moments cause undesirable noise and vibrations at the bearings that connect the mechanism to the ground. Due to these reasons the mechanism works in a disturbingly noisy manner and the bearings wear out quickly. Although the measures taken to prevent the noise and the vibrations cannot provide a fully satisfactory solution, they increase the cost of the system. Furthermore, due to the friction at the 2 joints that connect the mechanism to the ground, extra energy, which adversely affects the energy consumption of the mechanism, is consumed.

DISCLOSURE OF THE INVENTION

One of the purposes of this invention is to realize a mechanical force generator, such that, the wear at the joints that connect the mechanism to the ground is minimum since the reaction forces, reaction moments and friction forces at these joints are, to a great extent, due to the weights of the links only;

such that, the lives of the joints that connect the mechanism to the ground is maximum since the reaction forces, reaction moments and friction forces at these joints are, to a great extent, due to the weights of the links only;

such that, the maintenance costs of the joints that connect the mechanism to the ground are minimum since the lives of these joints have been maximized as much as possible;

such that, the shaking forces and moments transmitted to the ground are minimum since the reaction forces, reaction moments and friction forces at these joints are, to a great extent, due to the weights of the links only;

such that, the noise generated by the mechanism is minimum since the shaking forces and moments transmitted to the ground have been minimized;

such that, the vibrations transmitted to the ground is minimum since the shaking forces and moments transmitted to the ground have been minimized;

such that, the costs related to preventing noise and vibrations in the mechanism are minimum since the noise and the vibrations transmitted to the ground have been minimized as much as possible;

such that, the energy consumption of the mechanism is minimum since the friction forces at the joints that connect the mechanism to the ground are, to a great extent, due to the weights of the links only;

which, without using any actuators and by using only springs, can generate any desired force variation.

Another purpose of the invention is to realize a general purpose mechanism, such that, the wear at the joints that connect the mechanism to the ground is minimum since the reaction forces, reaction moments and friction forces at these joints are, to a great extent, due to the weights of the links only;

such that, the lives of the joints that connect the mechanism to the ground is maximum since the reaction forces, reaction moments and friction forces at these joints are, to a great extent, due to the weights of the links only;

such that, the maintenance costs of the joints that connect the mechanism to the ground are minimum since the lives of these joints have been maximized as much as possible;

such that, the shaking forces and moments transmitted to the ground are minimum since the reaction forces, reaction moments and friction forces at these joints are, to a great extent, due to the weights of the links only, such that, the noise generated by the mechanism is minimum since the shaking forces and moments transmitted to the ground have been minimized;

such that, the vibrations transmitted to the ground is minimum since the shaking forces and moments transmitted to the ground have been minimized;

such that, the costs related to preventing noise and vibrations in the mechanism are minimum since the noise and the vibrations transmitted to the ground have been minimized as much as possible;

such that, the energy consumption of the mechanism is minimum since the friction forces at the joints that connect the mechanism to the ground are, to a great extent, due to the weights of the links only;

in which, the translational motion of the output link can be obtained as any desired function of the translational motion of the input link;

that can be used in many different areas, such as hydraulically or pneumatically actuated machines, internal combustion engines and compressors.

Another purpose of the invention is to realize a general purpose mechanism, such that, the wear at the joints that connect the mechanism to link number 1 is minimum since the reaction forces, reaction moments and friction forces at these 4 joints are, to a great extent, due to the weights of the links and due to the external forces, external moments, inertia forces and inertia moments acting, only, on link number 1;

such that, the lives of the joints that connect the mechanism to link number 1 is maximum since the reaction forces, reaction moments and friction forces at these 4 joints are, to a great extent, due to the weights of the links and due to the external forces, external moments, inertia forces and inertia moments acting, only, on link number 1;

such that, the maintenance costs of the joints that connect the mechanism to link number 1 are minimum since the lives of these 4 joints have been maximized as much as possible;

such that, the energy consumption of the mechanism is minimum since the friction forces at the 4 joints that connect the mechanism to link number 1 are, to a great extent, due to the weights of the links and due to the external forces, external moments, inertia forces and inertia moments acting, only, on link number 1;

in which, the relative translational motion at a joint can be obtained as any desired function of the relative translational motion at another joint;

that can be used in many different areas, such as hydraulically or pneumatically actuated machines, internal combustion engines and compressors.

BRIEF DESCRIPTION OF THE INVENTION

A mechanism is a mechanical system which consists of links, connected to each other by joints; and, which is used to transfer motion and/or force from one location to another. High reaction forces and moments, and high frictional forces and moments that occur at the joints of a mechanism not only cause early wearing of the bearings; but, increase the energy consumption of the mechanism as well. Furthermore, mechanisms exert shaking forces and shaking moments to the ground that they are mounted on. The aforementioned shaking forces and moments are due to the reaction forces, reaction moments, frictional forces and frictional moments that occur at the joints that connect the mechanism to the ground; causing undesirable vibrations on the ground and noise.

The invention mentioned in this description is related to a one degree of freedom (as far as its practical usage is concerned), overconstrained (or, in permanently critical form), novel planar mechanism, the input and output links of which translate. In this description, the input and output links refer to any two links which are connected to the ground with a joint; and the frequently used assumption, which states that the input link is the link which actuates the mechanism, has not been used. The translational motion of the output link of the aforementioned original mechanism can be obtained as any desired function of the translational motion of the input link. Furthermore, provided that the kinematic dimensions, the inertial parameters of the links and the loading conditions of this novel mechanism satisfy certain conditions; the shaking forces transmitted to the ground, the shaking moments transmitted to the ground and the friction forces at the joints that connect the mechanism to the ground will be minimum, since, basically, they will depend on the weights of the links only. Since the frictional forces are minimized, the energy consumption of the mechanism will be minimum. The mechanical force generator, which is the subject of this invention; which can produce any desired force; for which the shaking forces transmitted to the ground, the shaking moments transmitted to the ground, the frictional forces at the joints that connect the mechanism to the ground, and hence the energy consumption of the mechanism, are minimum; is obtained by mounting springs between some of the links of the novel mechanism mentioned above.

Figure 4:
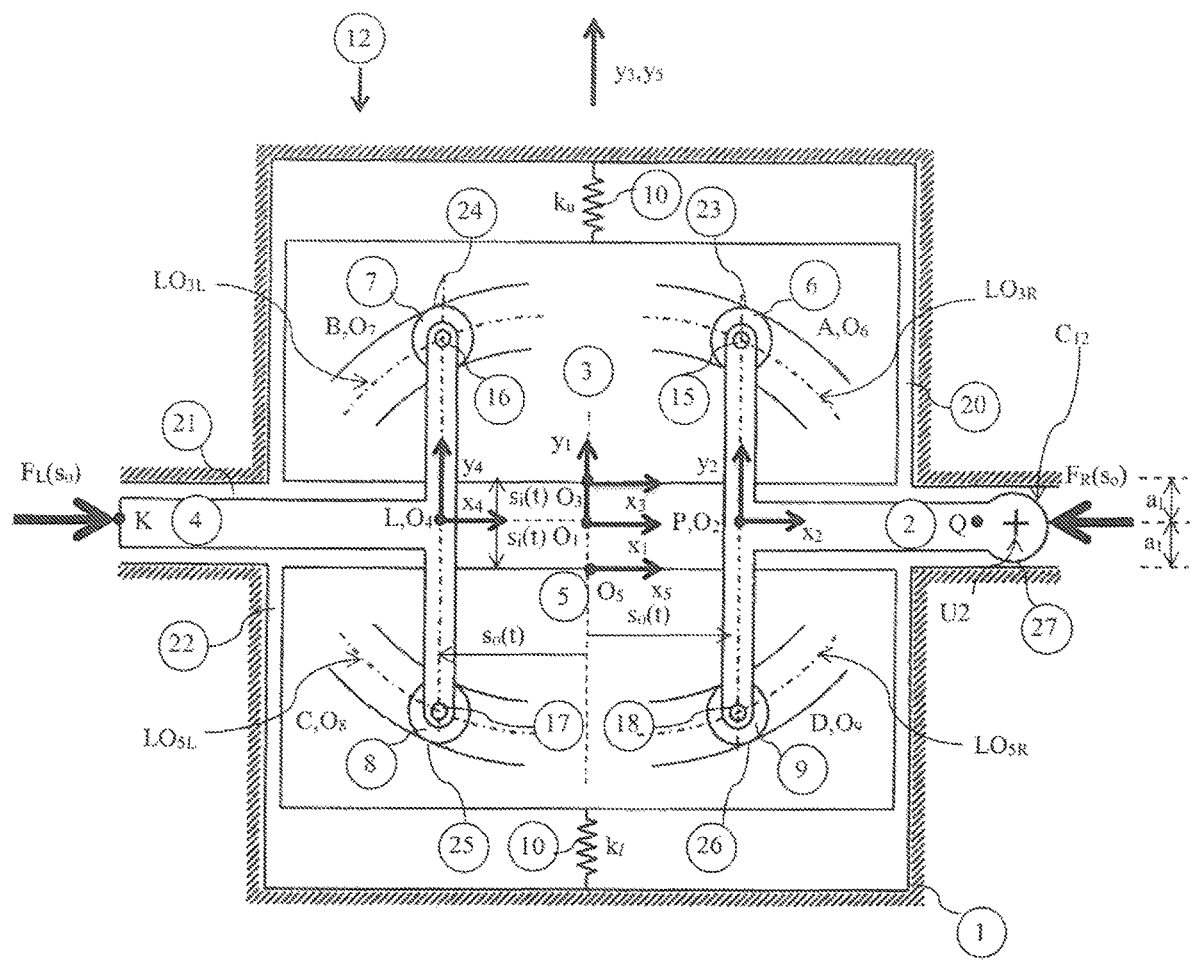

In this description, the mechanism named as the $EqMFG_{1\&2}$ mechanism (12) is a mechanism which is obtained by replacing the prismatic joint that connects links 1 and 2 (19) in the MFG mechanism (11) by a cylinder in slot joint that connects links 1 and 2 (27); and it is a mechanism which is not in permanently critical form (or, not overconstrained) (See FIG. 4). In case the kinematic dimensions and input motions of the MFG and $EqMFG_{1\&2}$ mechanisms are the same, the motions of the two mechanisms will be identical. $EqMFG_{1\&3}$ mechanism (see FIG. 5), on the other hand, is another mechanism which is not in permanently critical form (or, not overconstrained); and which is obtained from the MFG mechanism by replacing the prismatic joint that connects links 1 and 3 (20) by a cylinder in slot joint that connects links 1 and 3 (28). Similar to the $EqMFG_{1\&2}$ mechanism, in case the kinematic dimensions and input motions of the MFG and $EqMFG_{1\&3}$ mechanisms are the same, the motions of the two mechanisms will be identical. As was the case in the MFG mechanism, provided that the kinematic dimensions, the inertial parameters of the links and the loading conditions of the $EqMFG_{1\&2}$ and $EqMFG_{1\&3}$ mechanisms satisfy certain conditions, the shaking forces transmitted to the ground, the shaking moments transmitted to the ground and the friction forces at the joints that connect the mechanism to the ground, and because of this, the energy consumption of the mechanism, are minimum.

All of the mechanisms that are obtained by the method of kinematic inversion from the kinematic chains that the MFG, $EqMFG_{1\&2}$ and $EqMFG_{1\&3}$ mechanisms are derived from, possess advantages similar to the MFG, $EqMFG_{1\&2}$ and $EqMFG_{1\&3}$ mechanisms. In these mechanisms that are obtained by the kinematic inversion method, the relative translational motion at a joint can be obtained as any desired function of the relative translational motion at another joint. Furthermore, provided that the kinematic dimensions, the inertial parameters of the links and the loading conditions of the aforementioned mechanisms satisfy certain conditions, the reaction forces, the reaction moments and the Coulomb friction forces at each of the 4 joints that connect link 1 to links 2, 3, 4 and 5 of these mechanisms, to a great extent, will arise from the external forces and external moments acting on link 1 and the inertia forces and inertia moments, due to D'Alembert's principle, acting on link 1; and they will be, to a great extent, independent from the external forces and external moments that are acting on links other than link 1 (1) and the accelerations of the links other than link 1.

BRIEF DESCRIPTION OF THE DRAWINGS AND REFERENCES

"A Mechanical Force Generator and Related Kinematic Chains" that is realized to achieve the purpose of this invention is shown in the attached figures, which are listed below.

FIG. 1—Schematic view of a double slider mechanism that exists in the literature.

Figure 2:
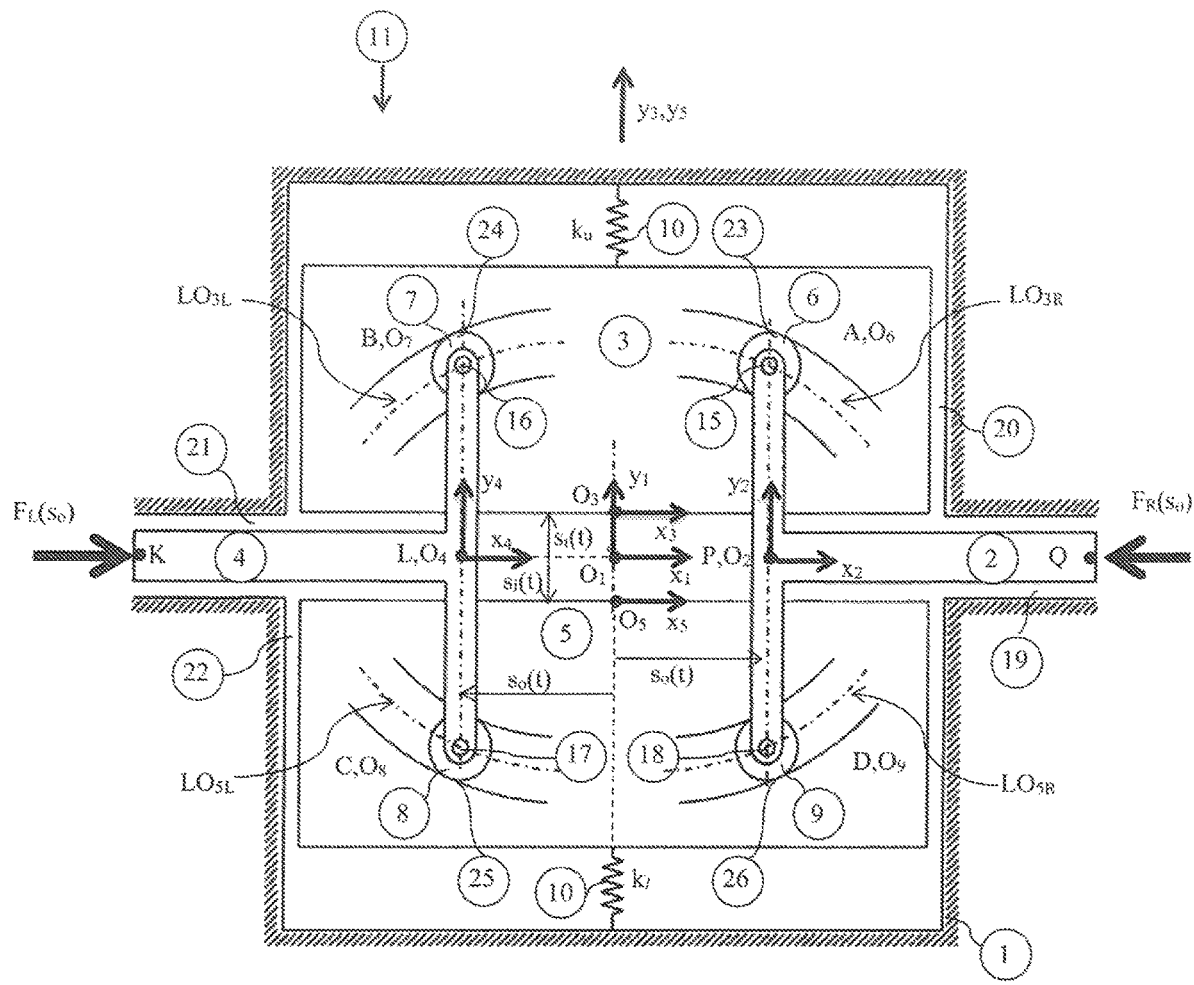

FIG. 2—Schematic view of the mechanical force generator (11) that is the subject of the invention.

FIG. 3—Table showing the joints that are used in the mechanical force generator (11) that is the subject of the invention.

FIG. 4—Schematic view of the mechanism named as Equivalent Mechanical Force Generator 1 & 2 (EqMFG$_{1\&2}$) (12), which is obtained by replacing the prismatic joint that connects links 1 and 2 (19) in the mechanical force generator (11) with a cylinder in slot joint that connects links 1 and 2 (27).

Figure 5:
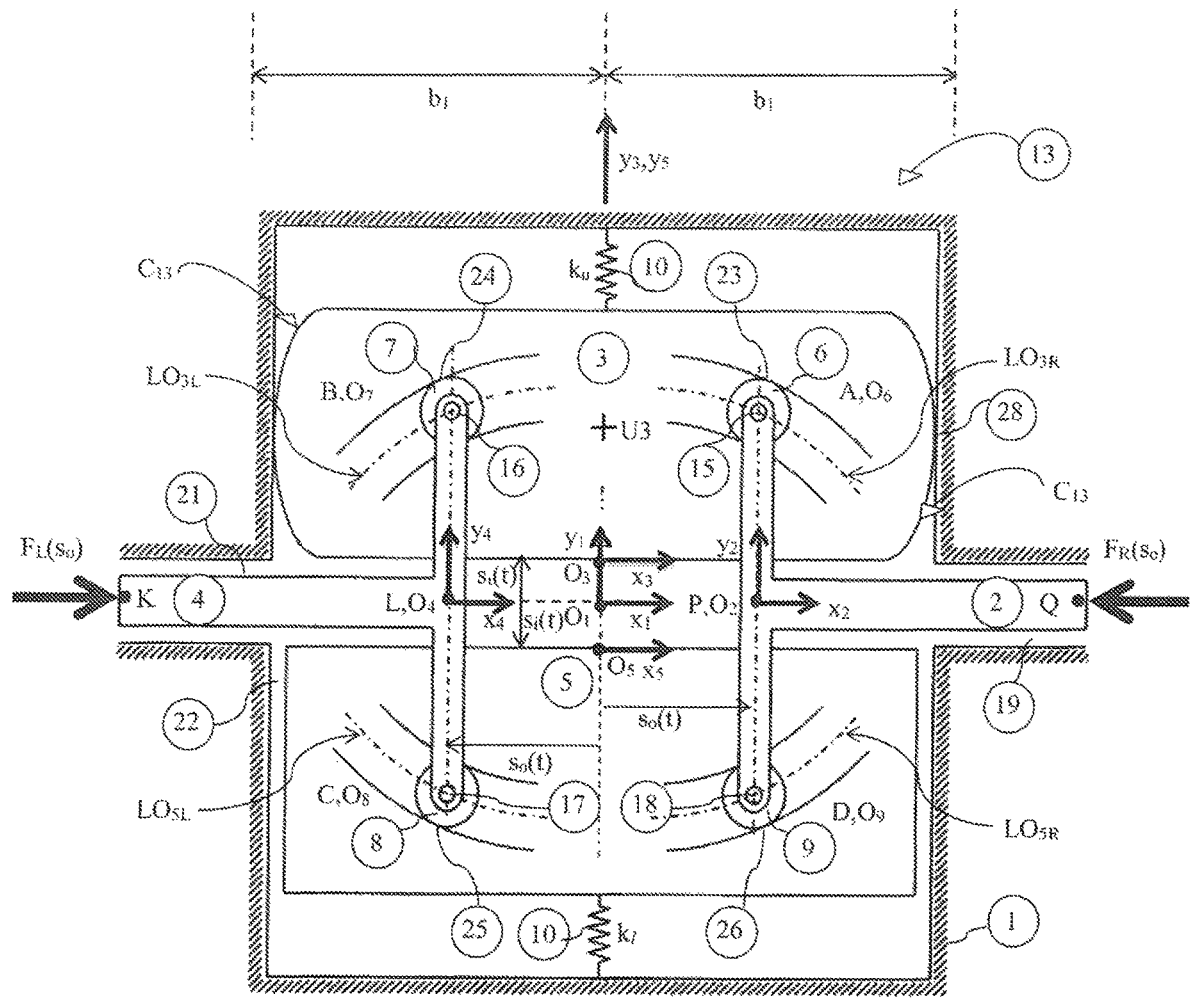

FIG. 5—Schematic view of the mechanism named as Equivalent Mechanical Force Generator 1 & 3 (EqMFG$_{1\&3}$) (13), which is obtained by replacing the prismatic joint that connects links 1 and 3 (20) in the mechanical force generator (11) with a cylinder in slot joint that connects links 1 and 3 (28).

Figure 6:
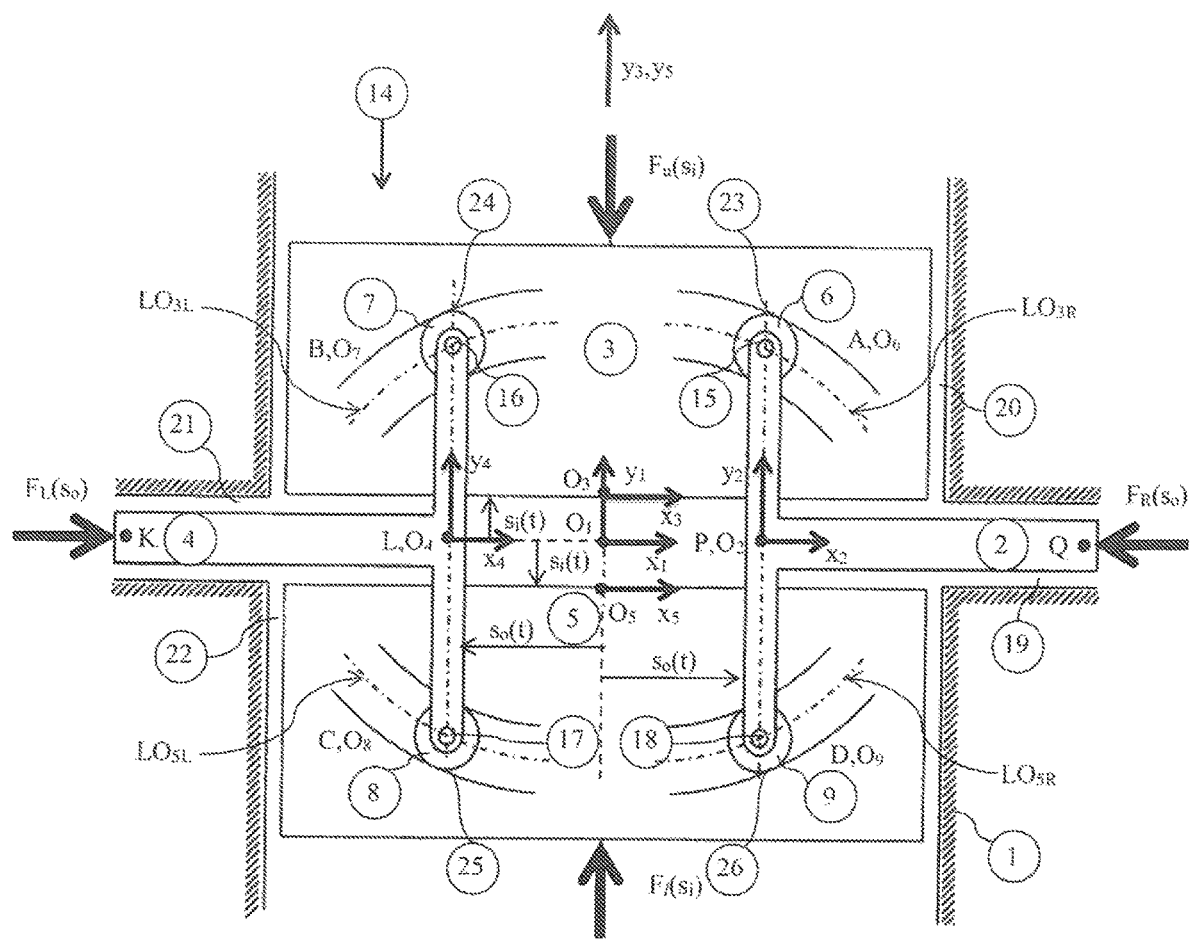

FIG. 6—Schematic view of the Minimum Friction and Shaking—Translation to any Translation (MinFaS-TaT) (14) mechanism which differs from the mechanical force generator (11) with respect to the loading conditions only.

FIG. 7—Table showing the conditions that the mechanical force generator (11) and the MinFaS-TaT (14) mechanisms must satisfy.

All parts shown in the figures have been numbered; leading to the correspondences that are listed below.

1. Link 1
2. Link 2
3. Link 3
4. Link 4
5. Link 5
6. Link 6
7. Link 7
8. Link 8
9. Link 9
10. Spring
11. Mechanical Force Generator
12. Equivalent Mechanical Force Generator—1&2 mechanism
13. Equivalent Mechanical Force Generator—1&3 mechanism
14. Minimum Friction and Shaking—Translation to any Translation mechanism
15. Revolute joint that connects link 2 (2) and link 6 (6)
16. Revolute joint that connects link 4 (4) and link 7 (7)
17. Revolute joint that connects link 4 (4) and link 8 (8)
18. Revolute joint that connects link 2 (2) and link 9 (9)
19. Prismatic joint that connects link 1 (1) and link 2 (2)
20. Prismatic joint that connects link 1 (1) and link 3 (3)
21. Prismatic joint that connects link 1 (1) and link 4 (4)
22. Prismatic joint that connects link 1 (1) and link 5 (5)
23. Cylinder in slot joint that connects link 3 (3) and link 6 (6)
24. Cylinder in slot joint that connects link 3 (3) and link 7 (7)
25. Cylinder in slot joint that connects link 5 (5) and link 8 (8)
26. Cylinder in slot joint that connects link 5 (5) and link 9 (9)
27. Cylinder in slot joint that connects link 1 (1) and link 2 (2)
28. Cylinder in slot joint that connects link 1 (1) and link 3 (3)

DETAILED DESCRIPTION OF THE INVENTION

A schematic view of the Mechanical Force Generator (11) is given in FIG. 2. In the MFG (11), there are totally 9 links, including the ground which is labelled as link 1. $O_1x_1y_1$, $O_2x_2y_2$, $O_3x_3y_3$, $O_4x_4y_4$, $O_5x_5y_5$, $O_6x_6y_6$, $O_7x_7y_7$, $O_8x_8y_8$ and $O_9x_9y_9$ coordinate systems are reference frames which are connected to links 1, 2, 3, 4, 5, 6, 7, 8 and 9 (1, 2, 3, 4, 5, 6, 7, 8 and 9) respectively, such that $x_2$, $x_3$, $x_4$ and $x_5$ axes are parallel to the $x_1$ axis; $y_2$, $y_3$, $y_4$ and $y_5$ axes, on the other hand, are parallel to the y axis. In order not to make the figure more complicated, the x and y axes belonging to links 6, 7, 8 and 9 (6, 7, 8 and 9) have not been shown in FIG. 2.

The joints used in the MFG (11) are shown in FIG. 3. In this table, R, P, and C, symbolizes a revolute joint, a prismatic joint and a cylinder in slot joint, respectively. By using FIG. 3, it is possible to observe which link is connected to which other link, and with what kind of a joint. For example, when one considers the 4$^{th}$ row of the 9×9 matrix given in FIG. 3, it is observed that link 4 (4) is connected to links 1, 7 and 8 (1, 7 and 8) by means of a prismatic joint, revolute joint and revolute joint, respectively.

Roller number 6 (6) used in the MFG (11) moves inside a slot on link 3 (3). The curve that is located exactly in the middle of this slot, labelled as $LO_{3R}$ (see FIG. 2), is the locus, on link 3 (3), of point $A_6$ on link 6 (6). Here, $A_6$ symbolizes point A on link 6 (6). In general, on the other hand, $P_i$ defines point P on link i. Point $B_7$, on the other hand, follows the curve $LO_{3L}$ on link 3 (3). Similarly, points $D_9$ and $C_8$ move along the curves $LO_{5R}$ and $LO_{5L}$ on link 5 (5), respectively.

The output links of the mechanical force generator (11) are links 2 and 4 (2 and 4), the positions of which are shown by $s_o(t)$. The forces $F_R(s_o)$ and $F_L(s_o)$ in FIG. 2, on the other hand, indicate the forces generated by the mechanical force generator (11) (i.e., the outputs of the generator). Since these forces have to be equal to each other (see equation (E50)), both forces can be denoted by $F(s_o)$. As can be understood from the symbols that are used, the forces $F_R(s_o)$ and $F_L(s_o)$ depend on the position of the output link.

In FIG. 2, there is a spring (10), with a spring constant of $k_u$, between the fixed chassis (1) and link 3 (3). The spring constant of the spring (10) between the chassis and link 5 (5), on the other hand, is labelled as $k_l$.

The mechanical force generator (11) is a planar mechanism, the input and output links of which execute translational motion; the practical degree of freedom of which is 1; and for which, it is possible to obtain any relation between the input link's position, $s_i(t)$, and the output link's position, $s_o(t)$ (See FIG. 2), that can be expressed as $$s_o = f(s_i) \tag{E1}$$

when the kinematic dimensions of the MFG are designed appropriately. Here, $f(s_i)$ symbolizes any function which depends on $s_i$, such that the function and its derivatives are continuous.

By using the MFG (11), in addition to generating a desired input-output relationship, it is also possible to generate any desired force $F(s_o)$ by properly designing the kinematic dimensions of the mechanical force generator (11), the free lengths of the springs (10) used and the spring constants $k_u$ and $k_l$.

In order to find the degree of freedom of the mechanical force generator (11), the equation $$F = \lambda(l - j - 1) + \sum_{i=1}^{i=j} f_i \quad \text{(E2)}$$

may be used. Here, F, $\lambda$, l and j denote the degree of freedom of the mechanism, the degree of freedom of the space in which the mechanism works, the number of links of the mechanism and the number of joints of the mechanism, respectively. $f_i$, on the other hand, is the degree of freedom of joint i. Since the MFG (11) is a planar mechanism, one has $$\lambda = 3 \quad \text{(E3)}$$

Furthermore, using FIG. 2 and FIG. 3, one obtains $$l = 9 \quad \text{(E4)}$$

$$j = 12 \quad \text{(E5)}$$

As seen in FIG. 3, in the MFG (11), there are four 1 degree of freedom revolute joints (15, 16, 17, 18); four 1 degree of freedom prismatic joints (19, 20, 21, 22); and four 2 degree of freedom cylinder in slot joints (23, 24, 25, 26). Hence, one obtains $$\sum_{i=1}^{i=j} f_i = 4 \times 1 + 4 \times 1 + 4 \times 2 = 16 \quad \text{(E6)}$$

If equations (E3)-(E6) are substituted into equation (E2), one obtains $$F = 4 \quad \text{(E7)}$$

On the other hand, the real degree of freedom of the mechanism should be $$F_g = 5 \quad \text{(E8)}$$

The reason for the difference between the degree of freedom obtained by using equation (E2) and the real degree of freedom is that, the MFG (11) is a mechanism which is in permanently critical form. In other words, because of the special kinematic dimensions used in the MFG (11) [See equations (E10)-(E25)], the constraints due the joints of the MFG (11) are not independent from each other. Because of these special kinematic dimensions, the coordinates, with respect to the $O_1x_1y_1$ coordinate system fixed to the ground (1), of the points $A_2$, $B_4$, $C_4$ and $D_2$ (See FIG. 2), which are the centers of the disks 6, 7, 8 and 9 (6, 7, 8 and 9), are $(x_a, y_a)$, $(-x_a, y_a)$, $(-x_a, -y_a)$ and $(x_a, -y_a)$, respectively, throughout the totality of the motion.

On the other hand, when the usage of the mechanism is considered, it can be said that the practical degree of freedom of the mechanical force generator (11) is $$F_{gp} = F_g - 4 = 1 \quad \text{(E9)}$$

since rotations of links 6, 7, 8 and 9 (6, 7, 8 and 9), around the axes which pass through the points A, B, C and D and which are parallel to the z axis, have no importance in an application.

The special kinematic dimensions that are used in the MFG (11), and that have been mentioned above, are listed below.

$$\angle Q_2P_2A_2 = \angle Q_2P_2D_2 = \pi/2 \quad \text{(E10)}$$

$$\angle K_4L_4B_4 = \angle K_4L_4C_4 = \pi/2 \quad \text{(E11)}$$

$$\overline{P_2A_2} = \overline{P_2D_2} = \overline{L_4B_4} = \overline{L_4C_4} \quad \text{(E12)}$$

$$(x_2 \text{ axis}) \Leftrightarrow (x_1 \text{ axis}) \quad \text{(E13)}$$

$$(x_4 \text{ axis}) \Leftrightarrow (x_1 \text{ axis}) \quad \text{(E14)}$$

$$(y_3 \text{ axis}) \Leftrightarrow (y_1 \text{ axis}) \quad \text{(E15)}$$

$$(y_5 \text{ axis}) \Leftrightarrow (y_1 \text{ axis}) \quad \text{(E16)}$$

$$r_6 = r_7 = r_8 = r_9 \quad \text{(E17)}$$

$$x_{LO_{3R}} = f(p) \quad \text{(E18)}$$

$$y_{LO_{3R}} = g(p) \quad \text{(E19)}$$

$$x_{LO_{3L}} = -f(p) \quad \text{(E20)}$$

$$y_{LO_{3L}} = g(p) \quad \text{(E21)}$$

$$x_{LO_{5R}} = f(p) \quad \text{(E22)}$$

$$y_{LO_{5R}} = -g(p) \quad \text{(E23)}$$

$$x_{LO_{5L}} = -f(p) \quad \text{(E24)}$$

$$y_{LO_{5L}} = -g(p) \quad \text{(E25)}$$

The symbol "$\Leftrightarrow$" in equations (E13)-(E16) has been used to mean "coincident"; whereas, in equation (E17), $r_6$, $r_7$, $r_8$ and $r_9$ symbolize the radii of the disks 6, 7, 8 and 9 (6, 7, 8 and 9), respectively, $(x_{LO_{3R}}, y_{LO_{3R}})$ symbolizes the x and y coordinates, with respect to the $O_3x_3y_3$ system, of a point on the $LO_{3R}$ curve. On the other hand, $(x_{LO_{3L}}, y_{LO_{3L}})$ symbolizes the x and y coordinates, with respect to the $O_3x_3y_3$ system, of a point on the $LO_{3L}$ curve. In a similar manner, $(x_{LO_{5R}}, y_{LO_{5R}})$ and $(x_{LO_{5L}}, y_{LO_{5L}})$ indicate the x and y coordinates, with respect to the $O_5x_5y_5$ system, of a point on the $LO_{5R}$ and $LO_{5L}$ curves, respectively. On the other hand, p symbolizes a parameter, the lower and upper bounds of which are $p_{min}$ and $p_{max}$. In other words, there is a constraint on the parameter p that can be expressed in the form $$p_{min} \leq p \leq p_{max} \quad \text{(E26)}$$

Finally, f and g are two functions which are used to define the curves $LO_{3R}$, $LO_{3L}$, $LO_{5R}$ and $LO_{5L}$. Here, the functions $$f(p), \frac{df}{dp}, \frac{d^2f}{dp^2}, g(p), \frac{dg}{dp} \text{ and } \frac{d^2g}{dp^2}$$

should be continuous.

Provided that the kinematic dimensions of the MFG (11) satisfy the conditions given by equations (E10)-(E25), throughout the motion of force generator (11), one will have $$\overline{O_1O_2} = \overline{O_3O_4} \quad \text{(E27)}$$

$$\overline{O_1O_3} = \overline{O_1O_5} \quad \text{(E28)}$$

In FIG. 2, the lengths $\overline{O_1O_2}$ and $\overline{O_1O_3}$ have been indicated as $s_o(t)$ and $s_i(t)$, respectively.

There are conditions that should be satisfied by the inertial parameters of the links of the MFG (11) too. These conditions are listed below.

$$m_2 = m_4 \tag{E29}$$

$$m_3 = m_5 \tag{E30}$$

$$m_6 = m_7 = m_8 = m_9 \tag{E31}$$

$$x_{G_3} = 0 \tag{E32}$$

$$x_{G_5} = 0 \tag{E33}$$

$$x_{G_6} = 0 \tag{E34}$$

$$x_{G_7} = 0 \tag{E35}$$

$$x_{G_8} = 0 \tag{E36}$$

$$x_{G_9} = 0 \tag{E37}$$

$$y_{G_2} = 0 \tag{E38}$$

$$y_{G_4} = 0 \tag{E39}$$

$$y_{G_6} = 0 \tag{E40}$$

$$y_{G_7} = 0 \tag{E41}$$

$$y_{G_8} = 0 \tag{E42}$$

$$x_{G_9} = 0 \tag{E43}$$

$$I_{G_6} = I_{G_7} = I_{G_8} = I_{G_9} \tag{E44}$$

Here, $G_i$, $m_i$, $x_{G_i}$, and $y_{G_i}$ symbolize the center of gravity, mass, the x coordinate of the center of gravity, with respect to the $O_i x_i y_i$ system attached to link i, and the y coordinate of the center of gravity, with respect to the $O_i x_i y_i$ system of link i, of link i, respectively. $I_{G_i}$, on the other hand, is the moment of inertia of link i with respect to an axis which passes from $G_i$ and which is parallel to the $z_i$ axis.

Finally, the conditions that should be satisfied by the external forces and external moments (See FIG. 2) applied to the MFG (11) are given below.

$$(k_u \text{ spring (10)}) \Leftrightarrow (y_1 \text{ axis}) \tag{E45}$$

$$(k_l \text{ spring (10)}) \Leftrightarrow (y_1 \text{ axis}) \tag{E46}$$

$$\overline{F}_{k_u} = -\overline{F}_{k_l} \tag{E47}$$

$$F_R(s_o) \Leftrightarrow (x_1 \text{ axis}) \tag{E48}$$

$$F_L(s_o) \Leftrightarrow (x_1 \text{ axis}) \tag{E49}$$

$$F_L(s_o) = F_R(s_o) \tag{E50}$$

In equality (E47), $\overline{F}_{k_u}$ and $\overline{F}_{k_l}$ indicate the forces applied to links 3 and 5 (3 and 5) by the springs (10) with spring constants $k_u$ and $k_l$, respectively.

In FIG. 4, a planar mechanism which is named as Equivalent Mechanical Force Generator—1 & 2 (12) is shown. In this figure, $C_{12}$ curve is an arc on a circle with radius at and center $U2_2$. Here, $U2_2$ symbolizes a point on link 2 (2) which lies on the $x_2$ axis. If EqMFG$_{1\&2}$ (12) and the MFG (11) which is shown in FIG. 2 are compared, it is seen that they are the same mechanism except for the type of joint which connects links 1 and 2 (1 and 2). In the MFG, there is a prismatic joint (19) between link 2 (2) and the ground (1). On the other hand, in the EqMFG$_{1\&2}$ (12), link 2 (2) and the ground (1) are connected to each other by means of a cylinder in slot joint (27). This aforementioned cylinder in slot joint (27) causes the path, on link 1 (1), of point $U2_2$ to be coincident with the $x_1$ axis; and it also causes link 2 (2) to rotate, with respect to link 1 (1), around an axis which is parallel to the $z_1$ axis and which passes through the point $U2_2$. Furthermore, the kinematic dimensions of the EqMFG$_{1\&2}$ (12) mechanism satisfy conditions (E10)-(E25). When the degree of freedom of the EqMFG$_{1\&2}$ mechanism is calculated by using equation (E2), one obtains $$F = 5 \tag{E51}$$

The degree of freedom thus obtained is the actual degree of freedom of the EqMFG$_{1\&2}$ mechanism. Because of this, on the contrary to the MFG (11) mechanism, the EqMFG$_{1\&2}$ (12) mechanism is not a mechanism which is in permanently critical form. In case the kinematic dimensions and the input motions of the EqMFG$_{1\&2}$ (12) and MFG (11) mechanisms are the same, the motions of the mechanisms will also be the same.

In FIG. 5, a planar mechanism named as Equivalent Mechanical Force Generator—1 & 3 (13) is shown. The $C_{13}$ curves in FIG. 5 lie on a circle with radius $b_1$ and center $U3_3$. Here, $U3_3$ symbolizes a point which lies on link 3 (3) and which is located on the $y_3$ axis. If EqMFG$_{1\&3}$ (13) and MFG (11) shown in FIG. 2 are compared, it will be seen that the mechanisms are the same except for the type of joint that connects links 1 and 3 (1 and 3). In the MFG (11), there is a prismatic joint (20) between link 3 (3) and the ground (1). On the other hand, in the EqMFG$_{1\&3}$ (13), link 3 (3) and the ground (1) are connected to each other by a cylinder in slot joint (28). This cylinder in slot joint (28) causes the path, on link 1 (1), of the point $U3_3$ to be coincident with the $y_1$ axis; and it also causes link 3 (3) to rotate, relative to link 1 (1), around an axis which is parallel to the $z_1$ axis and which passes through the point $U3_3$. Furthermore, the kinematic dimensions of the EqMFG$_{1\&3}$ (13) mechanism satisfy conditions (E10)-(E25). Similar to the EqMFG$_{1\&2}$ (12) mechanism, the EqMFG$_{1\&3}$ mechanism (13) is a 5 degree of freedom mechanism which is not in permanently critical form. Again, as was the case in the EqMFG$_{1\&2}$ (12) mechanism, in case the kinematic dimensions and the input motions of the EqMFG$_{1\&3}$ (13) and MFG (11) mechanisms are the same, the motions of the EqMFG$_{1\&3}$ (13) and MFG (11) mechanisms will also be the same.

The Equivalent Mechanical Force Generator—1 & 4 (EqMFG$_{1\&4}$) mechanism, on the other hand, has been obtained by eliminating the prismatic joint (21) connecting link 4 (4) and the ground (1) in the MFG (11); and by replacing it with a cylinder in slot joint instead. This aforementioned cylinder in slot joint causes the path, on link 1 (1), of the point $U4_4$ to be coincident with the $x_1$ axis; and it also causes link 4 to rotate, relative to link 1 (1), around an axis which is parallel to the $z_1$ axis and which passes through the point $U4_4$. Here, $U4_4$ symbolizes a point which lies on link 4 (4); and which is located on the $x_4$ axis. In a similar manner, the Equivalent Mechanical Force Generator—1 & 5 (EqMFG$_{1\&5}$) mechanism has been obtained by eliminating the prismatic joint (22) connecting link 5 (5) and the ground (1) in the MFG (11); and by replacing it with a cylinder in slot joint instead. This aforementioned cylinder in slot joint causes the path, on link 1 (1), of the point $U5_5$ to be coincident with the $y_1$ axis; and it also causes link 5 (5) to rotate, relative to link 1 (1), around an axis which is parallel to the $z_1$ axis and which passes through the point $U5_5$. Here, $U5_5$ symbolizes a point which lies on link 5 (5) and which is located on the $y_5$ axis. EqMFG$_{1\&4}$ and EqMFG$_{1\&5}$ mechanisms have the same properties with EqMFG$_{1\&2}$ (12) and EqMFG$_{1\&3}$ (13).

Now, related to the EqMFG$_{1\&2}$ (12) mechanism shown in FIG. 4, let us consider the 6 conditions that are given below.

(C1) The kinematic dimensions of the mechanism satisfy equalities (E10)-(E25).

(C2) The inertial parameters of the mechanism satisfy equalities (E29)-(E44).

(C3) The loading conditions of the mechanism satisfy equalities (E45)-(E50).

(C$_4$) Gravitational acceleration, R, is zero.

(C5) The friction related properties of the 4 revolute joints (15, 16, 17, 18) in the mechanism are equal to each other.

(C6) The friction related properties of the 4 cylinder in slot joints (23, 24, 25, 26) which connect links 6, 7, 8 and 9 (6, 7, 8 and 9) to links 3 and 5 (3 and 5) are equal to each other.

In case the above conditions are satisfied, all of the reaction forces and moments at the joints that connect the mechanism to the ground (1) will always [i.e., for any given input motion $s_i(t)$; for any given $s_o=f(s_i)$ relation given by equation (E1); and for any time t] be obtained to be $$\bar{F}_{12}(t)=F_{12}(t)\bar{j}_1=\bar{0} \tag{E52}$$

$$\bar{F}_{13}(t)=F_{13}(t)\bar{i}_1=\bar{0} \tag{E53}$$

$$\bar{M}_{13}(t)=M_{13}(t)\bar{k}_1=\bar{0} \tag{E54}$$

$$\bar{F}_{14}(t)=F_{14}(t)\bar{j}_1=\bar{0} \tag{E55}$$

$$\bar{M}_{14}(t)=M_{14}(t)\bar{k}_1=\bar{0} \tag{E56}$$

$$\bar{F}_{15}(t)=F_{15}(t)\bar{i}_1=\bar{0} \tag{E57}$$

$$\bar{M}_{15}(t)=M_{15}(t)\bar{k}_1=\bar{0} \tag{E58}$$

Here, $\bar{F}_{1i}(t)$ and $\bar{M}_{1i}(t)$ [i=2, 3, 4, 5] symbolize the reaction forces and moments, arising due to a prismatic, or cylinder in slot, joint that are exerted on link i by the ground. Furthermore, $\bar{i}_1, \bar{j}_1,$ and $\bar{k}_1$ are unit vectors which are parallel to the $x_1$, $y_1$ and $z_1$ axes. As can be seen from equations (E52)-(E58) clearly, the shaking force and the $z_1$ component of the shaking moment transmitted to the ground, by the EqMFG$_{1\&2}$ mechanism (12), are zero. Furthermore, since the reaction forces and moments at each of the 4 joints that connect the mechanism to the ground (19, 20, 21, 22) are zero, the Coulomb friction forces at each of these joints (19, 20, 21, 22) will also be zero. Here, one should pay attention to the fact that, whatever the force $F(s_o)$ produced by the EqMFG$_{1\&2}$ (12) and whatever the accelerations of the links of the EqMFG$_{1\&2}$ (12) are, the shaking force, the shaking moment and the frictional forces are still zero.

In case they satisfy the conditions that the EqMFG$_{1\&2}$ (12) mechanism must satisfy, which are conditions (C1)-(C6) given above, in a similar manner, in the EqMFG$_{1\&2}$ (13), EqMFG$_{1\&4}$ and EqMFG$_{1\&5}$ mechanisms, independent from the generated force $F(s_o)$ and the accelerations of the links, the shaking force transmitted to the ground, the shaking moment transmitted to the ground and the Coulomb frictional forces at each of the 4 joints which connect the mechanism to the ground (19, 20, 21, 22) will be zero.

As mentioned before, the MFG (11) that is shown in FIG. 2 is a mechanism which is in permanently critical form. For this reason, the dynamic force analysis of the mechanism is a problem that involves static indeterminacy. In other words, in order to perform a dynamic force analysis of the mechanism; besides the equations obtained from rigid body mechanics, one also needs deformation equations arising from the flexibility of the links. For this reason, when only the equations obtained from rigid body mechanics are used, the dynamic force analysis of the (MFG) (11) will yield infinitely many solutions. In case the MFG (11) satisfies the 6 conditions related to the EqMFG$_{1\&2}$ mechanism (12) given before (i.e., conditions C1-C6), these aforementioned solutions will also include the dynamic force analysis solutions of the EqMFG$_{1\&2}$ (12), EqMFG$_{1\&3}$ (13), EqMFG$_{1\&4}$ and EqMFG$_{1\&5}$ mechanisms, i.e., the solutions given by equations (E52)-(E58). For this reason, by designing the link flexibilities of the MFG (11) properly, it is also possible to make the shaking force transmitted to the ground, the shaking moment transmitted to the ground and the Coulomb frictional forces at each of the 4 prismatic joints that connect the mechanism to the ground (19, 20, 21, 22) zero; or, approximately zero.

In case condition (C4), which is one of the 6 conditions related to the MFG (11), EqMFG$_{1\&2}$ (12), EqMFG$_{1\&3}$ (13), EqMFG$_{1\&4}$ and EqMFG$_{1\&5}$ mechanisms, is not satisfied (i.e., gravitational acceleration, $\bar{g}$, is not zero), although the shaking force transmitted to the ground, the shaking moment transmitted to the ground and the Coulomb frictional forces at each of the 4 joints that connect the mechanism to the ground (19, 20, 21, 22) will not be zero; basically, they will be due to the weights of the links only and they will be independent from the generated force $F(s_o)$ and the accelerations of the links.

In FIG. 6, a mechanism, which differs from the MFG (11) only with respect to the loading, is shown. In this mechanism, the 2 springs (10) that exist in the MFG (11) have been removed; and the external forces $F_u(s_i)$ and $F_l(s_i)$ have been substituted instead. The aforementioned 2 external forces should satisfy the conditions given below.

$$F_u(s_i) \Leftrightarrow (y_1 \text{ axis}) \tag{E59}$$

$$F_l(s_i) \Leftrightarrow (y_1 \text{ axis}) \tag{E60}$$

$$F_u(s_i)=F_l(s_i) \tag{E61}$$

The mechanism given in FIG. 6 is named as the Minimum Friction and Shaking—Translation to any Translation mechanism (14); and, similar to the MFG (11) mechanism, it is a mechanism which is in permanently critical form. The conditions that should be satisfied by the kinematic dimensions, the inertial parameters and the loading conditions of the MFG (11) and the MinFaS-TaT (14) mechanisms are given in the table presented in FIG. 7.

Now, similar to the EqMFG$_{1\&2}$ (12) mechanism, let us consider the mechanism named as Equivalent Minimum Friction and Shaking—Translation to any Translation—1&2 (EqMinFaS-TaT$_{1\&2}$) mechanism. Except for the type of joint that connects links 1 and 2 (1 and 2), the EqMinFaS-TaT$_{1\&2}$ and MinFaS-TaT (14) mechanisms are the same. In the MinFaS-TaT (14), there is a prismatic joint (19) between link 2 (2) and the ground (1). In the EqMinFaS-TaT$_{1\&2}$ mechanism, on the other hand, link 2 (2) and the ground (1) have been connected by a cylinder in slot joint. The aforementioned cylinder in slot joint causes the path, on link 1 (1), followed by the point U2$_2$ to coincide with the $x_1$ axis; and it also causes link 2 (2) to rotate, relative to link 1 (1), around an axis which is parallel to the $z_1$ axis and which passes through the point U2$_2$. Here, U2$_2$ symbolizes a point on link 2 (2) that is located on the $x_2$ axis. On the contrary to the MinFaS-TaT (14) mechanism, the EqMinFaS-TaT$_{1\&2}$ mechanism is not a mechanism which is in permanently critical form. In case the kinematic dimensions and the input motions of the EqMinFaS-TaT$_{1\&2}$ and MinFaS-TaT (14) mechanisms are the same, the motions of the mechanisms are also the same.

EqMinFaS-TaT$_{1\&3}$, EqMinFaS-TaT$_{1\&4}$ and EqMinFaS-TaT$_{1\&5}$ mechanisms are also defined in a similar manner to the EqMinFaS-TaT$_{1\&2}$ mechanism. All of the claims made previously for the MFG (11), EqMFG$_{1\&2}$ (12), EqMFG$_{1\&3}$ (13), EqMFG$_{1\&4}$ and EqMFG$_{1\&5}$ mechanisms (related to the shaking force transmitted to the ground, shaking moment transmitted to the ground and the Coulomb frictional forces at each of the 4 joints that connect the mechanism to the ground) are also valid for the MinFaS-TaT (14), EqMinFaS-TaT$_{1\&2}$, EqMinFaS-TaT$_{1\&3}$, EqMinFaS-TaT$_{1\&4}$ and EqMinFaS-TaT$_{1\&5}$ mechanisms. In other words, in the MinFaS-TaT (14), EqMinFaS-TaT$_{1\&2}$, EqMinFaS-TaT$_{1\&3}$, EqMinFaS-TaT$_{1\&4}$ and EqMinFaS-TaT$_{1\&5}$ mechanisms, the shaking force transmitted to the ground, the shaking moment transmitted to the ground and the Coulomb frictional forces at each of the 4 joints that connect the mechanism to the ground, will be, basically, due to the weights of the links only.

As mentioned before, if the loading conditions are not considered, the MFG (11) and the MinFaS-TaT (14) mechanisms shown in FIG. 2 and FIG. 6 have no differences from each other. In other words, from a kinematic point of view, the MFG (11) and MinFaS-TaT (14) mechanisms are the same mechanism. Both mechanisms have been obtained from a planar kinematic chain [which is obtained by connecting 9 links to each other by using 4 revolute joints (15, 16, 17, 18), 4 prismatic joints (19, 20, 21, 22) and 4 cylinder in slot joints (23, 24, 25, 26), in accordance with the table in FIG. 3; and the kinematic dimensions of which satisfy conditions (E10)-(E25) J by making link 1 (1) to be unmovable (i.e., by making link 1 (1) to be the ground). The aforementioned novel kinematic chain has been named as Kinematic Chain with 4 Optimum Prismatic Joints (KCw4OPJ) in this description. Since KCw4OPJ is a mechanism which is in permanently critical form, all of the mechanisms that are obtained from this chain by using the kinematic inversion method will also be mechanisms which are in permanently critical form.

In this description, the kinematic chain that the EqMFG$_{1\&2}$ (12) and the EqMinFaS-TaT$_{1\&2}$ mechanisms, which do not differ from each other except for the loading conditions, are derived from has been named as Equivalent Kinematic Chain with 4 Optimum Prismatic Joints—1 & 2 (EqKCw4OPJ$_{1\&2}$). Since EqKCw4OPJ$_{1\&2}$, the kinematic dimensions of which satisfy conditions (E10)-(E25), is a planar kinematic chain which is not in permanently critical form; all of the mechanisms that are obtained from this kinematic chain by using the method of kinematic inversion will also be mechanisms which are not in permanently critical form.

In a similar manner, the kinematic chain that the EqMFG$_{1\&3}$ (13) and EqMinFaS-TaT$_{1\&3}$ mechanisms [which, if the loading conditions are not considered, do not have any differences from each other at all] are derived from is named, in this description, as Equivalent Kinematic Chain with 4 Optimum Prismatic Joints—1 & 3 (EqKCw4OJ$_{1\&3}$). Furthermore, the kinematic chain from which the EqMFG$_{1\&4}$ and EqMinFaS-TaT$_{1\&4}$ mechanisms are derived from; and the kinematic chain from which the EqMFG$_{1\&5}$ and EqMinFaS-TaT$_{1\&5}$ mechanisms are derived from are named, in this description, as Equivalent Kinematic Chain with 4 Optimum Prismatic Joints—1 & 4 (EqKCw4OPJ$_{1\&4}$) and Equivalent Kinematic Chain with 4 Optimum Prismatic Joints—1 & 5 (EqKCw4OPJ$_{1\&5}$), respectively. Since EqKCw4OPJ$_{1\&3}$, EqKCw4OPJ$_{1\&4}$ and EqKCw4OPJ$_{1\&5}$ planar kinematic chains, the kinematic dimensions of which satisfy conditions (E10)-(E25), are kinematic chains which are not in permanently critical form; the mechanisms that are obtained from these kinematic chains by using the method of kinematic inversion will also be mechanisms which are not in permanently critical form.

In order not to make the notation used more complicated, although they are the same kinematic chain in reality, the kinematic chains EqKCw4OPJ$_{1\&2}$ and EqKCw4OPJ$_{1\&4}$ have different names in this description. By the same reason, although they are not different kinematic chains, the kinematic chains EqKCw4OPJ$_{1\&3}$ and EqKCw4OPJ$_{1\&5}$ have different names in this description.

Provided that all mechanisms which are obtained from the EqKCw4OPJ$_{1\&2}$, EqKCw4OPJ$_{1\&3}$, EqKCw4OPJ$_{1\&4}$ and EqKCw4OPJ$_{1\&5}$ kinematic chains by the method of kinematic inversion satisfy conditions (C1)-(C6), the reaction forces and moments and the Coulomb friction forces at each of the 4 joints that connect link 1 (1) to links 2, 3, 4 and 5 (2, 3, 4 and 5) will arise from the external forces and external moments acting on link 1 (1) only and the inertial forces and inertial moments, due to D'Alembert's principle, acting on link 1 (1). In other words, in a similar manner to the EqMFG$_{1\&2}$ (12), EqMFG$_{1\&3}$ (13). EqMFG$_{1\&4}$ and EqMFG$_{1\&5}$ mechanisms, the reaction forces, the reaction moments and the Coulomb friction forces at the aforementioned 4 joints will be independent from the accelerations of the links other than link 1 (1) and $F_R(s_o)$, $F_L(s_o)$, $\overline{F}_{k_u}$ and $\overline{F}_{k_j}$.

As stated before, the mechanisms which are obtained from the kinematic chain KCw4OPJ will be mechanisms which are in permanently critical form. For this reason, the dynamic force analyses of these mechanisms will lead to problems which involve static indeterminacy. On the other hand, if the mechanisms which are obtained from the KCw4OPJ kinematic chain with the method of kinematic inversion satisfy conditions (C1)-(C6); and moreover, if, similar to the MFG (11) mechanism, the flexibilities of the links are designed in an appropriate manner; the reaction forces and moments and the Coulomb friction forces at each of the 4 prismatic joints (19, 20, 21, 22) that exist in the mechanism will, to a large extent, arise from the external forces and external moments acting on link 1 (1) only and the inertial forces and inertial moments, due to D'Alembert's principle, acting on link 1 (1). In other words, the reaction forces, the reaction moments and the Coulomb friction forces at the aforementioned 4 joints (19, 20, 21, 22), will be, to a large extent, independent from the accelerations of the links other than link 1 (1) and $F_R(s_o)$, $F_L(s_o)$, $\overline{F}_{k_u}$, and $\overline{F}_{k_j}$.

In case condition (C4) is not satisfied, i.e., the gravitational acceleration is not zero, in the kinematic chains KCw4OPJ, EqKCw4OP$_{1\&2}$, EqKCw4OPJ$_{1\&3}$, EqKCw4OPJ$_{1\&4}$ and EqKCw4OPJ$_{1\&5}$, the reaction forces and moments and the Coulomb friction forces at each of the 4 joints that connect link 1 to the other links will, moreover, be dependent on the weights of the links as well.

As is known, in a practical application, 2 links that are connected to each other by a prismatic joint are equivalent to a piston—cylinder pair that contains pressurized oil, or gas. For this reason, the mechanisms, that will be obtained using the method of kinematic inversion from the kinematic chain KCw4OPJ, which has four prismatic joints (19, 20, 21, 22); and the kinematic chains EqKCw4OPJ$_{1\&2}$, EqKCw4OPJ$_{1\&3}$, EqKCw4OPJ$_{1\&4}$ and EqKCw4OPJ$_{1\&5}$, which have three prismatic joints each, are expected to be useful in many different fields such as hydraulically or pneumatically actuated machines, internal combustion engines and compressors. In the aforementioned mechanisms, any number of actuators may be used. Furthermore, spring(s) and/or damper(s) can be mounted between any two links in the mechanisms.

The invention claimed is:

1. A planar kinematic chain comprising:

first, second, third, fourth, fifth, sixth, seventh, eighth and ninth links (1, 2, 3, 4, 5, 6, 7, 8, 9), and first, second, third and fourth revolute joints (15, 16, 17, 18), and first, second, third and fourth prismatic joints (19, 20, 21, 22), and first, second, third and fourth cylinder in slot joints (23, 24, 25, 26);

wherein, the second link (2) and the sixth link (6) are connected by the first revolute joint (15), the fourth link (4) and the seventh link (7) are connected by the second revolute joint (16), the fourth link (4) and the eighth link (8) are connected by the third revolute joint (17), the second link (2) and the ninth link (9) are connected by the fourth revolute joint (18), the first link (1) and the second link (2) are connected by the first prismatic joint (19), the first link (1) and the third link (3) are connected by the second prismatic joint (20), the first link (1) and the fourth link (4) are connected by the third prismatic joint (21), the first link (1) and the fifth link (5) are connected by the fourth prismatic joint (22), the third link (3) and the sixth link (6) are connected by the first cylinder in slot joint (23), the third link (3) and the seventh link (7) are connected by the second cylinder in slot joint (24), the fifth link (5) and the eighth link (8) are connected by the third cylinder in slot joint (25), the fifth link (5) and the ninth link (9) are connected by the fourth cylinder in slot joint (26);

wherein, the kinematic dimensions satisfy the conditions $$\angle QPA = \angle QPM = \pi/2 \quad (E62)$$

$$\angle KLB = \angle KLC = \pi/2 \quad (E63)$$

$$\overline{PA} = \overline{PD} = \overline{LB} = \overline{LC} \quad (E64)$$

$$x_2 \text{ axis is coincident with } x_1 \text{ axis} \quad (E65)$$

$$x_4 \text{ axis is coincident with } x_1 \text{ axis} \quad (E66)$$

$$y_3 \text{ axis is coincident with } y_1 \text{ axis} \quad (E67)$$

$$y_5 \text{ axis is coincident with } y_1 \text{ axis} \quad (E68)$$

$$r_6 = r_7 = r_8 = r_9 \quad (E69)$$

the parametric equations of the curve $LO_{3R}$ are given by $$x_{LO_{3R}} = f(p) \quad (E70)$$

$$y_{LO_{3R}} = g(p) \quad (E71)$$

the parametric equations of the curve $LO_{3L}$ are given by $$x_{LO_{3L}} = -f(p) \quad (E72)$$

$$y_{LO_{3L}} = g(p) \quad (E73)$$

the parametric equations of the curve $LO_{5R}$ are given by $$x_{LO_{5R}} = f(p) \quad (E74)$$

$$y_{LO_{5R}} = g(p) \quad (E75)$$

the parametric equations of the curve $LO_{5L}$ are given by $$x_{LO_{5L}} = -f(p) \quad (E76)$$

$$y_{LO_{5L}} = -g(p) \quad (E77)$$

where,

A, P, D, Q are points on the second link (2),

B, L, C, K are points on the fourth link (4), $x_1, y_1$ are mutually perpendicular axes fixed to the first link (1), $x_2, y_2$ are mutually perpendicular axes fixed to the second link (2), $x_3, y_3$ are mutually perpendicular axes fixed to the third link (3), $x_4, y_4$ are mutually perpendicular axes fixed to the fourth link (4), $x_5, y_5$ are mutually perpendicular axes fixed to the fifth link (5), $O_3$ and $O_5$ are origins of the body fixed coordinate systems on the third link (3) and on the fifth link (5), $r_6$ is radius of the sixth link (6), $r_7$ is radius of the seventh link (7), $r_8$ is radius of the eighth link (8), $r_9$ is radius of the ninth link (9), $LO_{3R}, LO_{3L}$ are the curves that correspond to the locus of points A, B with respect to the third link (3), $LO_{5R}, LO_{5L}$ are the curves that correspond to the locus of points D, C with respect to the fifth link (5), p is a parameter with lower and upper bounds $p_{min}$ and $p_{max}$, $x_{LO_{3R}}, y_{LO_{3R}}$ are the x and y coordinates, with respect to the $O_3x_3y_3$ system, of point A, $x_{LO_{3L}}, y_{LO_{3L}}$ are the x and y coordinates, with respect to the $O_3x_3y_3$ system, of point B, $x_{LO_{5R}}, y_{LO_{5R}}$ are the x and y coordinates, with respect to the $O_5x_5y_5$ system, of point D, $x_{LO_{5L}}, y_{LO_{5L}}$ are the x and y coordinates, with respect to the $O_5x_5y_5$ system, of point C, f(p), g(p) are two continuous functions with continuous first and second derivatives that are used to parametrically define the curves $LO_{3R}, LO_{3L}, LO_{5R}$ and $LO_{5L}$.

2. A planar kinematic chain comprising:

first, second, third, fourth, fifth, sixth, seventh, eighth and ninth links (1, 2, 3, 4, 5, 6, 7, 8, 9), and first, second, third and fourth revolute joints (15, 16, 17, 18), and first, second, third and fourth prismatic joints (19, 20, 21, 22), and first, second, third and fourth cylinder in slot joints (23, 24, 25, 26);

wherein, the second link (2) and the sixth link (6) are connected by the first revolute joint (15), the fourth link (4) and the seventh link (7) are connected by the second revolute joint (16), the fourth link (4) and the eighth link (8) are connected by the third revolute joint (17), the second link (2) and the ninth link (9) are connected by the fourth revolute joint (18), the first link (1) and the second link (2) are connected by the first prismatic joint (19), the first link (1) and the third link (3) are connected by the second prismatic joint (20), the first link (1) and the fourth link (4) are connected by the third prismatic joint (21), the first link (1) and the fifth link (5) are connected by the fourth prismatic joint (22), the third link (3) and the sixth link (6) are connected by the first cylinder in slot joint (23), the third link (3) and the seventh link (7) are connected by the second cylinder in slot joint (24), the fifth link (5) and the eighth link (8) are connected by the third cylinder in slot joint (25), the fifth link (5) and the ninth link (9) are connected by the fourth cylinder in slot joint (26);

wherein, the kinematic dimensions do not satisfy all of the sixteen conditions $$\angle QPA = \angle QPD = \pi/2 \quad (E62)$$

$$\angle KLB = \angle KLC = \pi/2 \quad (E63)$$

$$\overline{PA} = \overline{PD} = \overline{LB} = \overline{LC} \quad (E64)$$

$$x_2 \text{ axis is coincident with } x_1 \text{ axis} \quad (E65)$$

$$x_4 \text{ axis is coincident with } x_1 \text{ axis} \quad (E66)$$

$y_3$ axis is coincident with $y_1$ axis (E67)

$y_5$ axis is coincident with $y_1$ axis (E68)

$r_6 = r_7 = r_8 = r_9$ (E69)

the parametric equations of the curve $LO_{3R}$ are given by $x_{LO_{3R}} = f(p)$ (E70)

$y_{LO_{3R}} = g(p)$ (E71)

the parametric equations of the curve $LO_{3L}$ are given by $x_{LO_{3L}} = -f(p)$ (E72)

$y_{LO_{3L}} = g(p)$ (E73)

the parametric equations of the curve $LO_{5R}$ are given by $x_{LO_{5R}} = f(p)$ (E74)

$Y_{LO_{5R}} = -g(p)$ (E75)

the parametric equations of the curve $LO_{5L}$ are given by $x_{LO_{5L}} = -f(p)$ (E76)

$y_{LO_{5L}} = -g(p)$ (E77)

where,

A, P, D, Q are points on the second link (2),
B, L, C, K are points on the fourth link (4),
$x_1, y_1$ are mutually perpendicular axes fixed to the first link (1), $x_2, y_2$ are mutually perpendicular axes fixed to the second link (2), $x_3, y_3$ are mutually perpendicular axes fixed to the third link (3), $x_4, y_4$ are mutually perpendicular axes fixed to the fourth link (4), $x_5, y_5$ are mutually perpendicular axes fixed to the fifth link (5),
$O_3$ and $O_5$ are origins of the body fixed coordinate systems on the third link (3) and on the fifth link (5),
$r_6$ is radius of the sixth link (6), $r_7$ is radius of the seventh link (7), $r_8$ is radius of the eighth link (8), $r_9$ is radius of the ninth link (9),
$LO_{3R}$, $LO_{3L}$ are the curves that correspond to the locus of points A, B with respect to the third link (3),
$LO_{5R}$, $LO_{5L}$ are the curves that correspond to the locus of points D, C with respect to the fifth link (5),
p is a parameter with lower and upper bounds $p_{min}$ and $p_{max}$,
$x_{LO_{3R}}, y_{LO_{3R}}$ are the x and y coordinates, with respect to the $O_3x_3y_3$ system, of point A,
$x_{LO_{3L}}, y_{LO_{3L}}$ are the x and y coordinates, with respect to the $O_3x_3y_3$ system, of point B,
$x_{LO_{5R}}, Y_{LO_{5R}}$ are the x and y coordinates, with respect to the $O_5x_5y_5$ system, of point D,
$x_{LO_{5L}}, y_{LO_{5L}}$ are the x and y coordinates, with respect to the $O_5x_5y_5$ system, of point C,
f(p), g(p) are two continuous functions with continuous first and second derivatives that are used to parametrically define the curves $LO_{3R}$, $LO_{3L}$, $LO_{5R}$ and $LO_{5L}$;
wherein, the actual degree of freedom, relative to any link selected from the group consisting of the first, second, third, fourth, fifth, sixth, seventh, eighth and ninth links (1, 2, 3, 4, 5, 6, 7, 8, 9), is strictly greater than the degree of freedom given by the equation $$F = \lambda(l - j - 1) + \sum_{i=1}^{i=j} f_i \quad (E2)$$

where

F is the degree of freedom of the kinematic chain, relative to any link selected from the group consisting of the first, second, third, fourth, fifth, sixth, seventh, eighth and ninth links (1, 2, 3, 4, 5, 6, 7, 8, 9), obtained from equation (E2),
$\lambda = 3$ = degree of freedom of planar space in which the kinematic chain is restricted to move,
l = 9 = number of links in the kinematic chain,
j = 12 = number of joints in the kinematic chain,
$f_i$ is the degree of freedom of joint i.

3. A planar kinematic chain comprising:
first, second, third, fourth, fifth, sixth, seventh, eighth and ninth links (1, 2, 3, 4, 5, 6, 7, 8, 9), and first, second, third and fourth revolute joints (15, 16, 17, 18), and second, third and fourth prismatic joints (20, 21, 22), and first, second, third, fourth and fifth cylinder in slot joints (23, 24, 25, 26, 27);
wherein, the second link (2) and the sixth link (6) are connected by the first revolute joint (15), the fourth link (4) and the seventh link (7) are connected by the second revolute joint (16), the fourth link (4) and the eighth link (8) are connected by the third revolute joint (17), the second link (2) and the ninth link (9) are connected by the fourth revolute joint (18), the first link (1) and the third link (3) are connected by the second prismatic joint (20), the first link (1) and the fourth link (4) are connected by the third prismatic joint (21), the first link (1) and the fifth link (5) are connected by the fourth prismatic joint (22), the third link (3) and the sixth link (6) are connected by the first cylinder in slot joint (23), the third link (3) and the seventh link (7) are connected by the second cylinder in slot joint (24), the fifth link (5) and the eighth link (8) are connected by the third cylinder in slot joint (25), the fifth link (5) and the ninth link (9) are connected by the fourth cylinder in slot joint (26), the first link (1) and the second link (2) are connected by the fifth cylinder in slot joint (27);
wherein, the kinematic dimensions satisfy the eighteen conditions $\angle QPA = \angle QPD = \pi/2$ (E62)

$\angle KLB = \angle KLC = \pi/2$ (E63)

$\overline{PA} = \overline{PD} = \overline{LB} = \overline{LC}$ (E64)

$x_2$ axis is coincident with $x_1$ axis (E65)

$x_4$ axis is coincident with $x_1$ axis (E66)

$y_3$ axis is coincident with $y_1$ axis (E67)

$y_5$ axis is coincident with $y_1$ axis (E68)

$r_6 = r_7 = r_8 = r_9$ (E69)

the parametric equations of the curve $LO_{3R}$ are given by $x_{LO_{3R}} = f(p)$ (E70)

$y_{LO_{3R}} = g(p)$ (E71)

the parametric equations of the curve $LO_{3L}$ are given by $x_{LO_{3L}} = -f(p)$ (E72)

$y_{LO_{3L}} = g(p)$ (E73)

the parametric equations of the curve $LO_{5R}$ are given by $x_{LO_{5R}} = f(p)$ (E74)

$y_{LO_{5R}} = -g(p)$ (E75)

the parametric equations of the curve $LO_{5L}$ are given by $$x_{LO_{5L}} = -f(p) \tag{E76}$$

$$y_{LO_{5L}} = -g(p) \tag{E77}$$

the locus, on the first link (1), of point $U2$ on the
second link (2) is the $x_1$ axis (E78)

the second link (2) is able to rotate, relative to the
first link (1), around an axis which is parallel to
the $z_1$ axis and which passes through the point
$U2$ on the second link (2) (E79)

where,
A, P, D, Q are points on the second link (2),
B, L, C, K are points on the fourth link (4),
$x_1$, $y_1$ are mutually perpendicular axes fixed to the first link (1), $x_2$, $y_2$ are mutually perpendicular axes fixed to the second link (2), $x_3$, $y_3$ are mutually perpendicular axes fixed to the third link (3), $x_4$, $y_4$ are mutually perpendicular axes fixed to the fourth link (4), $x_5$, $y_5$ are mutually perpendicular axes fixed to the fifth link (5),
$O_3$ and $O_5$ are origins of the body fixed coordinate systems on the third link (3) and on the fifth link (5),
$r_6$ is radius of the sixth link (6), $r_7$ is radius of the seventh link (7), $r_8$ is radius of the eighth link (8), $r_9$ is radius of the ninth link (9),
$LO_{3R}$, $LO_{3L}$ are the curves that correspond to the locus of points A, B with respect to the third link (3),
$LO_{5R}$, $LO_{5L}$ are the curves that correspond to the locus of points D, C with respect to the fifth link (5),
p is a parameter with lower and upper bounds $p_{min}$ and $p_{max}$,
$x_{LO_{3R}}$, $Y_{LO_{3R}}$ are the x and y coordinates, with respect to the $O_3x_3y_3$ system, of point A,
$x_{LO_{3L}}$, $y_{LO_{3L}}$ are the x and y coordinates, with respect to the $O_3x_3y_3$ system, of point B,
$x_{LO_{5R}}$, $Y_{LO_{5R}}$ are the x and y coordinates, with respect to the $O_5x_5y_5$ system, of point D,
$x_{LO_{5L}}$, $y_{LO_{5L}}$ are the x and y coordinates, with respect to the $O_5x_5y_5$ system, of point C,
f(p), g(p) are two continuous functions with continuous first and second derivatives that are used to parametrically define the curves $LO_{3R}$, $LO_{3L}$, $LO_{5R}$ and $LO_{5L}$.

4. A planar kinematic chain comprising:
first, second, third, fourth, fifth, sixth, seventh, eighth and ninth links (1, 2, 3, 4, 5, 6, 7, 8, 9), and first, second, third and fourth revolute joints (15, 16, 17, 18), and first, third and fourth prismatic joints (19, 21, 22), and first, second, third, fourth and sixth cylinder in slot joints (23, 24, 25, 26, 28);
wherein, the second link (2) and the sixth link (6) are connected by the first revolute joint (15), the fourth link (4) and the seventh link (7) are connected by the second revolute joint (16), the fourth link (4) and the eighth link (8) are connected by the third revolute joint (17), the second link (2) and the ninth link (9) are connected by the fourth revolute joint (18), the first link (1) and the second link (2) are connected by the first prismatic joint (19), the first link (1) and the fourth link (4) are connected by the third prismatic joint (21), the first link (1) and the fifth link (5) are connected by the fourth prismatic joint (22), the third link (3) and the sixth link (6) are connected by the first cylinder in slot joint (23), the third link (3) and the seventh link (7) are connected by the second cylinder in slot joint (24), the fifth link (5) and the eighth link (8) are connected by the third cylinder in slot joint (25), the fifth link (5) and the ninth link (9) are connected by the fourth cylinder in slot joint (26), the first link (1) and the third link (3) are connected by the sixth cylinder in slot joint (28);
wherein, the kinematic dimensions satisfy the eighteen conditions $$\angle QPA = \angle QPD = \pi/2 \tag{E62}$$

$$\angle KLB = \angle KLC = \pi/2 \tag{E63}$$

$$\overline{PA} = \overline{PD} = \overline{LB} = \overline{LC} \tag{E64}$$

$x_2$ axis is coincident with $x_1$ axis (E65)

$x_4$ axis is coincident with $x_1$ axis (E66)

$y_3$ axis is coincident with $y_1$ axis (E67)

$y_5$ axis is coincident with $y_1$ axis (E68)

$$r_6 = r_7 = r_8 = r_9 \tag{E69}$$

the parametric equations of the curve $LO_{3R}$ are given by $$x_{LO_{3R}} = f(p) \tag{E70}$$

$$y_{LO_{3R}} = g(p) \tag{E71}$$

the parametric equations of the curve $LO_{3L}$ are given by $$x_{LO_{3L}} = -f(p) \tag{E72}$$

$$y_{LO_{3L}} = g(p) \tag{E73}$$

the parametric equations of the curve $LO_{5R}$ are given by $$x_{LO_{5R}} = f(p) \tag{E74}$$

$$y_{LO_{5R}} = -g(P) \tag{E75}$$

the parametric equations of the curve $LO_{5L}$ are given by $$x_{LO_{5L}} = -f(p) \tag{E76}$$

$$Y_{LO_{5L}} = -g(p) \tag{E77}$$

the locus, on the first link (1), of point $U3$ on the
third link (3) is the $y_1$ axis (E80)

the third link (3) is able to rotate, relative to the first
link (1), around an axis which is parallel to the
$z_1$ axis and which passes through the point $U3$
on the third link (3) (E81)

where,
A, P, D, Q are points on the second link (2),
B, L, C, K are points on the fourth link (4),
$x_1$, $y_1$ are mutually perpendicular axes fixed to the first link (1), $x_2$, $y_2$ are mutually perpendicular axes fixed to the second link (2), $x_3$, $y_3$ are mutually perpendicular axes fixed to the third link (3), $x_4$, $y_4$ are mutually perpendicular axes fixed to the fourth link (4), $x_5$, $y_5$ are mutually perpendicular axes fixed to the fifth link (5),
$O_3$ and $O_5$ are origins of the body fixed coordinate systems on the third link (3) and on the fifth link (5),
$r_6$ is radius of the sixth link (6), $r_7$ is radius of the seventh link (7), $r_8$ is radius of the eighth link (8), $r_9$ is radius of the ninth link (9),
$LO_{3R}$, $LO_{3L}$ are the curves that correspond to the locus of points A, B with respect to the third link (3),
$LO_{5R}$, $LO_{5L}$ are the curves that correspond to the locus of points D, C with respect to the fifth link (5),
p is a parameter with lower and upper bounds $p_{min}$ and $p_{max}$,
$x_{LO_{3R}}$, $y_{LO_{3R}}$ are the x and y coordinates, with respect to the $O_3x_3y_3$ system, of point A,
$x_{LO_{3L}}$, $y_{LO_{3L}}$ are the x and y coordinates, with respect to the $O_3x_3y_3$ system, of point B, $x_{LO_{5R}}$, $y_{LO_{5R}}$ are the x and y coordinates, with respect to the $O_5x_5y_5$ system, of point D, $x_{LO_{5L}}$, $y_{LO_{5L}}$ are the x and y coordinates, with respect to the $O_5x_5y_5$ system, of point C, f(p), g(p) are two continuous functions with continuous first and second derivatives that are used to parametrically define the curves $LO_{3R}$, $LO_{3L}$, $LO_{5R}$ and $LO_{5L}$.

5. The planar kinematic chain according to claim 1, wherein one link selected from the group consisting of the first, second, third, fourth, fifth, sixth, seventh, eighth and ninth links (1, 2, 3, 4, 5, 6, 7, 8, 9) is attached rigidly to the ground so that the aforementioned selected link is unable to move.

6. The planar kinematic chain according to claim 2, wherein one link selected from the group consisting of the first, second, third, fourth, fifth, sixth, seventh, eighth and ninth links (1, 2, 3, 4, 5, 6, 7, 8, 9) is attached rigidly to the ground so that the aforementioned selected link is unable to move.

7. The planar kinematic chain according to claim 3, wherein one link selected from the group consisting of the first, second, third, fourth, fifth, sixth, seventh, eighth and ninth links (1, 2, 3, 4, 5, 6, 7, 8, 9) is attached rigidly to the ground so that the aforementioned selected link is unable to move.

8. The planar kinematic chain according to claim 4, wherein one link selected from the group consisting of the first, second, third, fourth, fifth, sixth, seventh, eighth and ninth links (1, 2, 3, 4, 5, 6, 7, 8, 9) is attached rigidly to the ground so that the aforementioned selected link is unable to move.

* * * * *